United States Patent
Chi et al.

(10) Patent No.: US 11,133,542 B2
(45) Date of Patent: *Sep. 28, 2021

(54) BATTERY PACK INCLUDING HEAT CONDUCTION MEDIUM WITH LOUVER FIN SHAPE

(71) Applicant: LG CHEM, LTD., Seoul (KR)

(72) Inventors: Ho-June Chi, Daejeon (KR); Dal-Mo Kang, Daejeon (KR); Jeong-O Mun, Daejeon (KR); Sung-Won Seo, Daejeon (KR); Yoon-Koo Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 125 days.

This patent is subject to a terminal disclaimer.

(21) Appl. No.: 16/348,386

(22) PCT Filed: Jan. 17, 2018

(86) PCT No.: PCT/KR2018/000811
§ 371 (c)(1),
(2) Date: May 8, 2019

(87) PCT Pub. No.: WO2018/186566
PCT Pub. Date: Oct. 11, 2018

(65) Prior Publication Data
US 2020/0067156 A1     Feb. 27, 2020

(30) Foreign Application Priority Data

Apr. 6, 2017 (KR) .................. 10-2017-0044961

(51) Int. Cl.
*H01M 10/6556* (2014.01)
*H01M 10/613* (2014.01)
(Continued)

(52) U.S. Cl.
CPC ......... *H01M 10/6556* (2015.04); *B60L 50/64* (2019.02); *B60L 58/26* (2019.02);
(Continued)

(58) Field of Classification Search
CPC combination set(s) only.
See application file for complete search history.

(56) References Cited

U.S. PATENT DOCUMENTS 7,605,562 B2 * 10/2009 Kim .................. H01M 10/6566
320/107
8,293,397 B2 * 10/2012 Uchida ............... H01M 2/1077
429/120
(Continued)

FOREIGN PATENT DOCUMENTS

EP    3 534 429 A1    4/2019
EP    3 573 129 A1    11/2019
(Continued)

OTHER PUBLICATIONS

International Search Report dated May 3, 2018, issued in corresponding International Application No. PCT/KR2018/000811.
(Continued)

*Primary Examiner* — Ula C Ruddock
*Assistant Examiner* — Sarika Gupta
(74) *Attorney, Agent, or Firm* — Morgan, Lewis & Bockius LLP

(57) ABSTRACT

Disclosed is a battery pack, which includes a plurality of battery modules; a tray giving a space where the plurality of battery modules are placed; a plurality of beam frames installed to traverse an upper surface of the tray to partition spaces where the plurality of battery modules are capable of being individually placed; and a plurality of heatsinks formed to have a hollow structure through which a coolant flows, the plurality of heatsinks being selectively coupled to (Continued)

a part of the plurality of beam frames so as to be disposed to face a side surface of the battery modules, respectively, wherein a heat conduction medium having a louver structure is interposed at a thermal interface of the heatsink and the battery module.

13 Claims, 7 Drawing Sheets

(51) Int. Cl.
| | |
|---|---|
| *H01M 10/625* | (2014.01) |
| *H01M 10/6551* | (2014.01) |
| *H01M 10/6554* | (2014.01) |
| *H01M 10/6567* | (2014.01) |
| *B60L 50/64* | (2019.01) |
| *B60L 58/26* | (2019.01) |
| *H01M 50/20* | (2021.01) |
| *B60K 6/28* | (2007.10) |

(52) U.S. Cl.
CPC ....... *H01M 10/613* (2015.04); *H01M 10/625* (2015.04); *H01M 10/6551* (2015.04); *H01M 10/6554* (2015.04); *H01M 10/6567* (2015.04); *H01M 50/20* (2021.01); *B60K 6/28* (2013.01); *B60Y 2200/91* (2013.01); *B60Y 2200/92* (2013.01); *B60Y 2306/05* (2013.01); *B60Y 2400/112* (2013.01); *H01M 2220/20* (2013.01)

(56) References Cited

U.S. PATENT DOCUMENTS

| | | |
|---|---|---|
| 9,786,880 B2 | 10/2017 | Hwang et al. |
| 10,665,915 B2* | 5/2020 | Kim .................... H01M 10/663 |
| 2006/0246348 A1 | 11/2006 | Hamada et al. |
| 2013/0071700 A1* | 3/2013 | Hsu ..................... H01M 10/613 |
| | | 429/50 |
| 2015/0333304 A1 | 11/2015 | Sekine |
| 2017/0012330 A1 | 1/2017 | Kim et al. |
| 2018/0145294 A1 | 5/2018 | Choi et al. |
| 2019/0267682 A1 | 8/2019 | Seo et al. |

FOREIGN PATENT DOCUMENTS

| | | |
|---|---|---|
| JP | 2010-118497 A | 5/2010 |
| JP | 2013-004341 A1 | 1/2013 |
| JP | 2013-187101 A | 9/2013 |
| JP | 2014-102915 A | 6/2014 |
| JP | 2014-154401 A | 8/2014 |
| KR | 10-1039759 B1 | 6/2011 |
| KR | 10-2015-0047373 A | 5/2015 |
| KR | 10-2015-0099965 A | 9/2015 |
| KR | 10-2017-0034643 A | 3/2017 |
| WO | 2014/103007 A1 | 7/2014 |

OTHER PUBLICATIONS

Office Action dated Jul. 13, 2020, issued in corresponding Japanese Patent Application No. 2019-528758.
Extended European Search Report dated Jan. 28, 2020, issued in corresponding EP Application No. 18780294.

* cited by examiner

BATTERY PACK INCLUDING HEAT CONDUCTION MEDIUM WITH LOUVER FIN SHAPE

TECHNICAL FIELD

The present disclosure relates to a battery pack, and more particularly, to a battery module cooling technique and a loading structure thereof. The present application claims priority to Korean Patent Application No. 10-2017-0044961 filed on Apr. 6, 2017 in the Republic of Korea, the disclosures of which are incorporated herein by reference.

BACKGROUND ART

Unlike a primary battery which is not rechargeable, a secondary battery refers to a battery capable of charging and discharging and is used as a power source for an energy storage system (ESS), an electric vehicle (EV) or a hybrid electric vehicle (HEV) as well as small advanced electronic devices such as a mobile phone, a PDA and a notebook computer.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

For example, when a plurality of battery cells are connected in series or in parallel to configure a battery pack, it is common to configure a battery module composed of a plurality of battery cells first, and then configure a battery pack by using a plurality of battery modules and adding other components. In other words, the battery module refers to a component where a plurality of secondary batteries are connected in series or in parallel, and the battery pack refers to a component where a plurality of battery modules are connected in series or in parallel to increase capacity and output.

Meanwhile, in a battery pack composed of multiple battery modules, it is important to easily discharge heat generated from each battery module. If the heat of the battery module generated during charging and discharging is not effectively removed, heat accumulation may occur, resulting in deterioration of the battery module and causing ignition or explosion. Thus, a high-output large-capacity battery pack essentially requires a cooling device for cooling the battery modules included therein.

Generally, the cooling method of a battery pack is classified into an air cooling type and a water cooling type, and the water cooling type generating less noise and ensuring better cooling performance is broadly used in the art.

FIGS. 1 and 2 are schematic diagrams for illustrating a cooling configuration of a conventional water cooling battery pack.

For example, as shown in FIGS. 1 and 2, the conventional water cooling battery pack may include a heatsink 2 of a hollow structure, which has a flow path so that a coolant may flow therethrough. The heatsink 2 is in contact with a battery module 1 and absorbs heat of the battery module 1 by a temperature difference. Thus, the contact state between the heatsink 2 and the battery module 1 gives an important influence on the cooling performance.

If the heatsink 2 is disposed below the battery modules 1 as shown in FIG. 1, the heatsink 2 is pressed by the weight of the battery modules 1 to maintain the contact between the battery modules 1 and the heatsink 2 to some extent. However, since the appearances of the battery modules 1 and the heatsink 2 are substantially not regular, their surface roughness is not good. Thus, in order to solve this problem, a thermal interface material (TIM) 3 may be interposed between the battery modules 1 and the heatsink 2 to improve the thermal conductivity.

Depending on the stacking form of the battery cells or due to the design of the pack case, a heatsink 2' may be disposed in contact with a side surface of the battery module 1' as shown in FIG. 2. However, in this case, different from the configuration of FIG. 1, the heatsink 2' is not pressed by the weight of the battery module, and thus it is not easy that the heatsink 2' comes into close contact with the battery module 1' by using a general thermal interface material (TIM) 3. For example, even though the heatsink 2' is mounted to the side surface of the battery module 1', the contact state is weak at the other region than the mounted portion, and the gap between them is highly likely to be increased if an external impact is applied thereto.

Meanwhile, in the case of an electric vehicle, unexpected impact and vibration may be applied to the battery pack during operation. In this case, the electrical connection between the battery modules may be broken, or the pack case supporting the battery modules may be deformed.

Thus, in particular, the battery pack for an electric vehicle is required to have sufficient durability against external impact and vibration. To solve this problem, a crash beam is often used to increase the mechanical stiffness of the battery pack. Here, the crash beam refers to a beam-like structure that is installed at a tray constituting the battery pack case to enhance the rigidity of the tray. The tray including the crash beam has a high impact resistance and is not easily deformed by external impact or vibration.

However, even though the mechanical rigidity of the battery pack is improved by installing the crash beam, in this case, the space available for loading battery modules is reduced as much. Further, if the essential cooling device configuration such as a heatsink is further added, the volume ratio or the energy density of the battery pack including the heatsink is lowered.

DISCLOSURE

Technical Problem

The present disclosure is designed to solve the problems of the related art, and therefore the present disclosure is directed to providing a battery pack, which has enough durability against external impact and vibration, is capable of accommodating battery modules and a cooling device with excellent space efficiency, and has a thermal conduction medium capable of reinforcing the contact state of a heatsink to the battery modules.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising: a plurality of battery modules; a tray giving a space where the plurality of battery modules are placed; a plurality of beam frames installed to traverse an upper surface of the tray to partition spaces where the plurality of battery modules are capable of being individually placed; and a plurality of heatsinks formed to have a hollow structure through which a coolant flows, the plurality of heatsinks being selectively coupled to a part of the plurality of beam frames so as to be disposed to face a side surface of the battery modules, respectively, wherein a heat conduction medium having a louver structure may be interposed at a thermal interface of the heatsink and the battery module.

The heat conduction medium may include a plate surface attached to one surface of the heatsink and a plurality of louver fins formed to protrude obliquely at a predetermined acute angle with respect to the plate surface.

The plurality of louver fins may have a property to be elastically or plastically deformed when an external pressure is applied thereto.

The heat conduction medium may be a 10XX™ series aluminum alloy.

The plate surface of the heat conduction medium may be laser-welded to one surface of the heatsink.

A part of the plurality of beam frames may be an angled beam frame with a hollow therein, and the heatsink may be located inside the angled beam frame.

A part of the plurality of beam frames may be an I-type beam frame, and the heatsink may be provided to be mountable to recessed portions formed at both sides of a column that forms a height of the I-type beam frame.

The heatsink may be shaped corresponding to the recessed portion and be adhered thereto by a thermal conductive adhesive to be integrated with the I-type beam frame.

Another part of the plurality of beam frames may be a single center frame that traverses a center of the tray, and the I-type beam frames may intersect the center frame and are disposed at the tray at regular intervals, so that the plurality of battery modules are arranged in a 2×N matrix.

Each of the heatsinks may have a hollow structure with an input port and an output port provided at one end and the other end thereof so that a coolant flows in or out therethrough, and is installed to traverse the upper surface of the tray along the I-type beam frames through the center frame.

The battery pack may further comprise a pack cover configured to cover an upper portion of the tray; and two side frames configured to cover both side surfaces of the tray, respectively, wherein the two side frames may be provided in the form of a manifold tube communicating with the input ports and the output ports of the heatsinks to form a path for supplying and discharging the coolant.

The center frame may be provided in the form of an angled tube having a plurality of holes formed at an outer side surface thereof, and a connecting module may be provided in the center frame to connect the plurality of battery modules in series and/or in parallel.

In another aspect of the present disclosure, there is also provided an electric vehicle, comprising the battery pack defined above. The vehicle may include an electric vehicle (EV) and a hybrid electric vehicle (HEV).

Advantageous Effects

According to an embodiment of the present disclosure, the contact force of the individual battery modules to the heatsink may be enhanced by using a heat conduction medium of a louver structure, which allows elastic or plastic deformation. As a result, the cooling efficiency may be improved, and the individual battery modules may be stably supported even though an external impact or vibration is applied thereto.

According to another embodiment of the present disclosure, the stiffness and volume ratio of the battery pack may be increased by coupling the beam frame and the heatsink in a space efficient manner, and the cooling configuration for the individual battery modules may be compactly implemented.

BEST MODE

Figure 1:
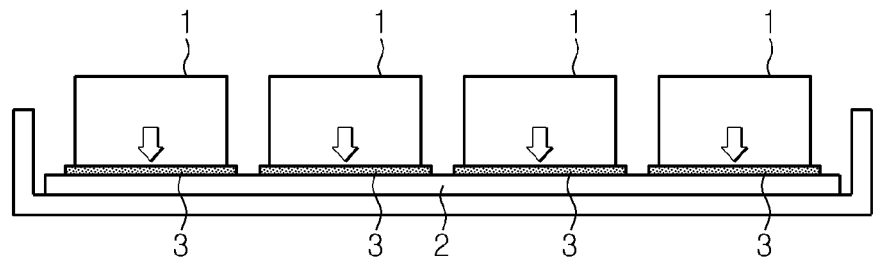
FIGS. 1 and 2 are schematic diagrams for illustrating a cooling configuration of a conventional water cooling battery pack.
Figure 2:
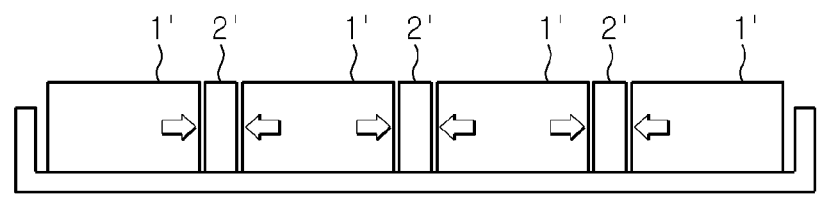

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

That is, the embodiments described in the specification and depicted shown in the drawings are only the most preferred embodiments of the present disclosure and do not represent all the technical ideas of the present disclosure, and thus it should be understood that there may be various equivalents and variations capable of replacing the embodiments at the time of this application.

Figure 3:
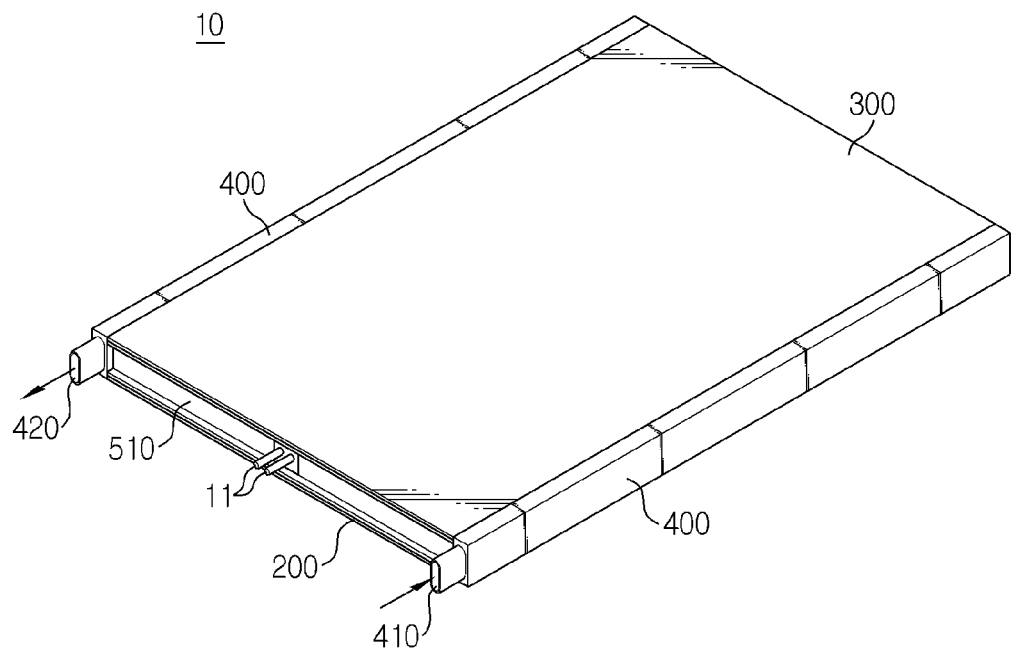
FIG. 3 is a schematic perspective view showing a battery pack according to an embodiment of the present disclosure.
Figure 4:
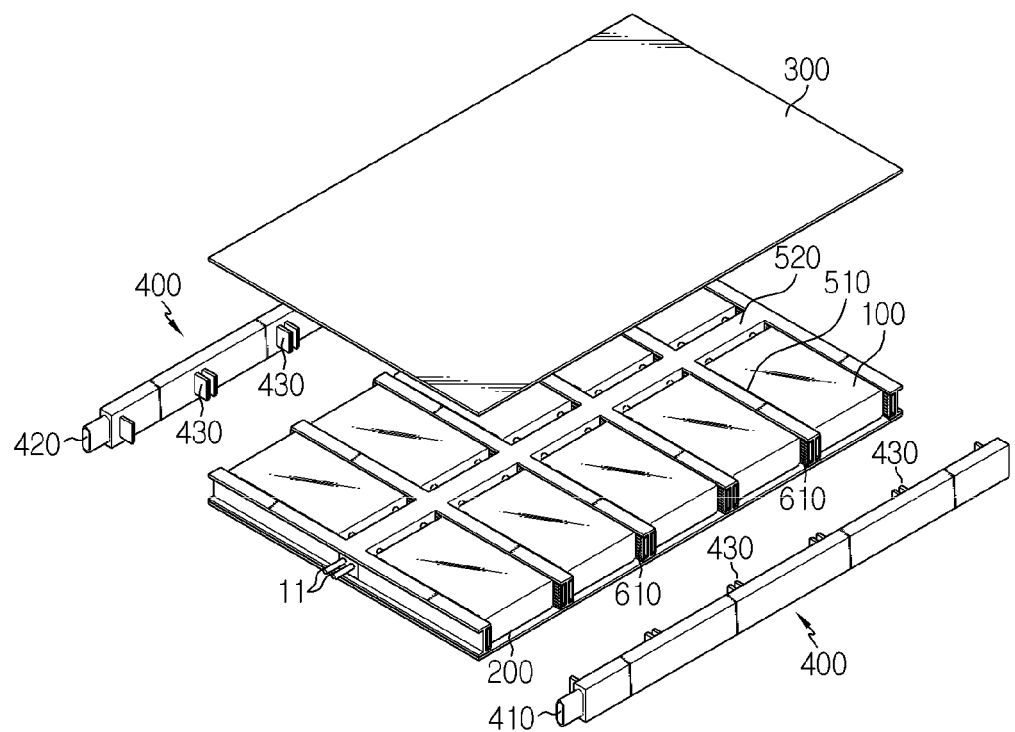
FIG. 4 is an exploded perspective view of FIG. 3.
Figure 5:
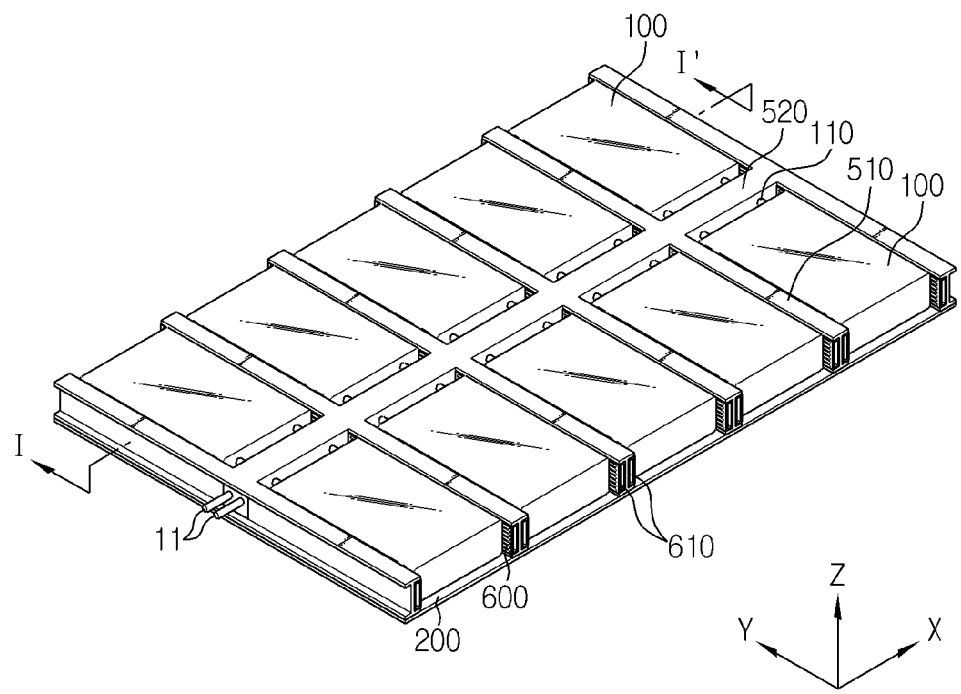
FIG. 5 is a perspective view showing a tray at which a plurality of battery modules of FIG. 4 are loaded.
Figure 6:
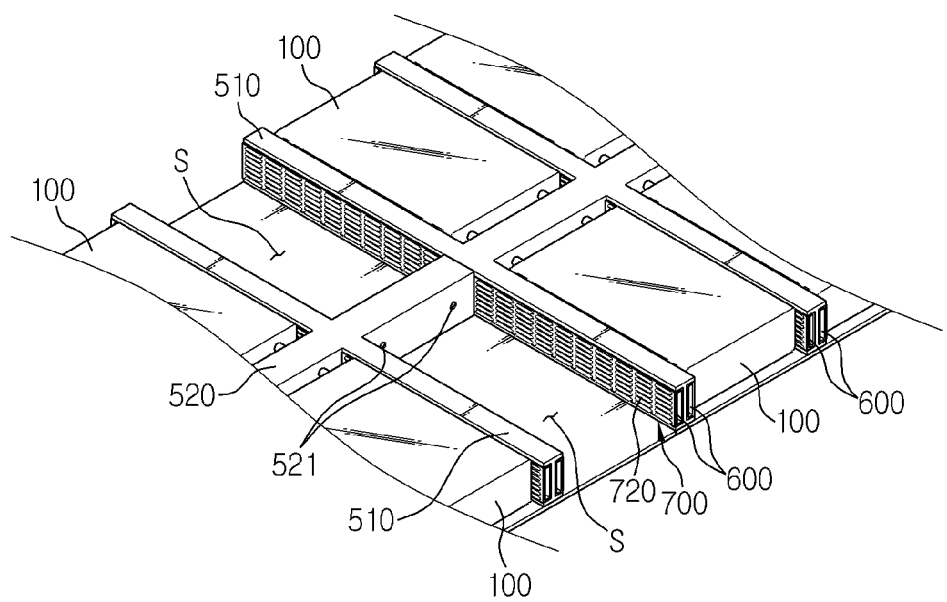
FIG. 6 is a perspective view showing a main portion of a tray where the unit battery modules are partially removed from FIG. 5.

FIG. 3 is a schematic perspective view showing a battery pack according to an embodiment of the present disclosure, FIG. 4 is an exploded perspective view of FIG. 3, FIG. 5 is a perspective view showing a tray at which a plurality of battery modules of FIG. 4 are loaded, and FIG. 6 is a perspective view showing a main portion of a tray where the unit battery modules are partially removed from FIG. 5.

First, referring to FIGS. 3 and 4, the battery pack 10 according to an embodiment of the present disclosure includes a plurality of battery modules 100, and a pack case accommodating the battery modules 100. The pack case may include a tray 200 giving a space where the plurality of battery modules 100 are placed, a pack cover 300 for packaging and accommodating the plurality of battery modules 100 together with the tray 200, and two side frames 400.

A plurality of battery cells (not shown) are stacked in the battery module 100, and the battery module 100 may further include various other components. For example, the battery cell may be a pouch-type secondary battery, and a plurality of battery cells may be provided and electrically connected to each other.

Though not shown in the figures, each battery cell may include various components such as an electrode assembly, a battery case accommodating the electrode assembly, and an electrode lead protruding out of the battery case and electrically connected to the electrode assembly. The electrode lead may include a positive electrode lead and a negative electrode lead. Here, the positive electrode lead may be connected to a positive electrode plate of the electrode assembly, and the negative electrode lead may be connected to a negative electrode plate of the electrode assembly.

The battery module 100 may further include stacking frames and a module end plate for stacking and protecting the pouch-type secondary battery.

The stacking frames are used for stacking secondary batteries and hold the secondary batteries not to be moved. The stacking frames are provided to be stacked one another to serve as a guide for assembling the secondary batteries. For reference, the stacking frames may be replaced by various other terms such as cell covers or cartridges.

The module end plate is an element for protecting and fixing the battery cell stack and may mean an angled structure surrounding the outer periphery of the battery cell stack or a plate-like structure padded on at least one surface of the battery cell stack. The module end plate is preferably made of a metal material with high mechanical rigidity and excellent thermal conductivity.

Though not shown for the sake of convenience, the battery module 100 may further include cooling pins interposed between the battery cells. The cooling fins are thin members with thermally conductive, such as aluminum, and have ends extending outward to connect to other heat absorbing media, such as a heatsink 600, to transfer the heat of the battery cells to the outside.

As described above, the battery module 100 may refer to a collection of a plurality of battery cells or a collection of a plurality of battery cells and other components for stacking and protecting the plurality of battery cells. In addition, the battery pack 10 of the present disclosure may refer to a collection including a plurality of unit battery modules 100.

Referring to FIGS. 4 and 5, the battery pack 10 according to this embodiment is formed using ten unit battery modules 100 in total. The unit battery modules 100 may be loaded on the upper surface of the tray 200 in a 2×5 matrix form and be packaged by the pack cover 300 and two side frames 400.

The tray 200 and the pack cover 300 may be formed in a plate shape having an approximately large area and may be disposed at the lower and upper portions of the battery modules 100, respectively, to cover the lower and upper portions of the battery modules 100. In addition the two side frames 400 may be located at both side surfaces of the tray 200 to cover both side surfaces of the battery modules 100.

In particular, two side frames 400 of this embodiment may be provided in the form of a manifold tube. In more detail, seeing FIG. 4, the two side frames 400 have a passageway formed therein to serve as a pipe and have an inlet 410 or an outlet 420 formed at the outer portion thereof and a plurality of connectors 430 respectively connectable to input ports 610 and output ports (located at a side opposite to the input ports in FIG. 4) of the heatsinks 600, explained later. The two side frames 400 serve to distribute the coolant to the heatsinks 600 or to collect the coolant from the heatsinks 600. That is, the two side frames 400 may be regarded as components of the pack case and form supply and discharge paths of the coolant into or out of the battery pack 10.

The pack case composed of the tray 200, the pack cover 300 and the two side frames 400 as described above may give mechanical support for the battery modules 100 and protect the battery modules 100 from external impacts. Thus, the tray 200, the pack cover 300, and the two side frames 400 may be preferably made of metal material such as steel to ensure rigidity.

Figure 7:
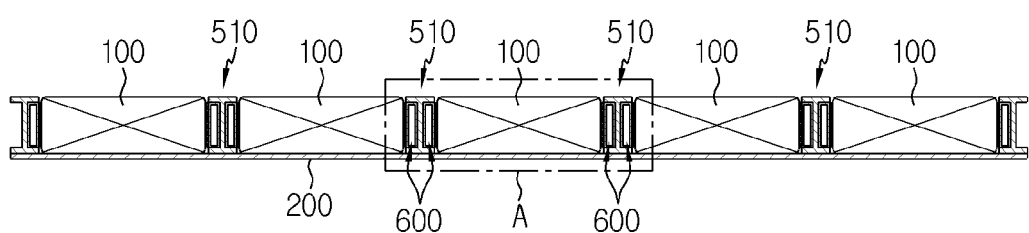
FIG. 7 is a cross-sectional view, taken along the line I-I' of FIG. 5.

Referring to FIGS. 5 to 7, the battery pack 10 according to the present disclosure includes a plurality of beam frames 510, 520 installed to traverse the upper surface of the tray 200 to partition spaces in which a plurality of battery modules 100 may be individually placed, and a plurality of heatsinks 600 having a hollow structure through which the coolant may flow and selectively coupled to a part of the plurality of beam frames to face the side surface of each battery module 100. In addition, a heat conduction medium 700 having a louver structure may be interposed in a thermal interface of the heatsink 600 and the battery module 100.

In this embodiment, some of the plurality of beam frames are I-type beam frames 510, and some of the plurality of beam frames are beam frames with an angled tube form. Hereinafter, the beam frame in the form of an angled tube will be referred to as a center frame 520.

More specifically, as shown in FIG. 5, six I-type beam frames 510 may be arranged at regular intervals along the vertical direction (the X-axis direction) of the tray 200, and one center frame 520 may be arranged to cross the six I-type beam frames 510 and traverse the center of the tray 200. At this time, the interval between two neighboring I-type beam frames 510 corresponds to the width of the unit battery module 100, and the height of the I-type beam frame 510 may be equal to or higher than the height of the battery module 100. In this configuration, partitioned accommodation spaces S in which ten unit battery modules 100 in total may be loaded in a 2×5 matrix form may be formed on the upper surface of the tray 200.

Each unit battery module 100 may be placed in the individual accommodation space S so that the module electrode terminals 110 thereof face the center frame 520. Both side surfaces of the placed unit battery module 100 may be in contact with and face the heatsinks engaged with two I-type beam frames 510.

Though not shown in detail for convenience, a plurality of holes 521 may be formed in the outer surface of the center frame 520 along the length direction (the X-axis direction). In addition, a connecting module (not shown) may be provided inside the center frame 520. Two unit battery modules 100 are provided in each row, and the module electrode terminals 110 thereof may be inserted into the holes 521 of the center frame 520 to face each other and are connected to the connecting module.

The connecting module may be composed of bus bars made of electrically conductive material and forming a serial and/or parallel network. The connecting module may connect the plurality of battery modules 100 in series and/or in parallel. In addition, the connecting module may be connected to a terminal 11 of the battery pack 10 located at an outer side of the front surface of the tray 200, and the terminal 11 may be electrically connected to another device outside the battery pack 10.

According to the 2×N matrix arrangement of the battery modules 100 and the configuration of the I-type beam frames 510 and the center frame 520, it is possible to easily fix and load the battery modules 100, and it is possible to enhance the mechanical stiffness of the tray 200. In addition, it is possible to simplify the wiring structure without exposing a high-voltage cable or the like on the tray 200. Accordingly, the safety and space utilization of the battery pack 10 may be improved.

Figure 8:
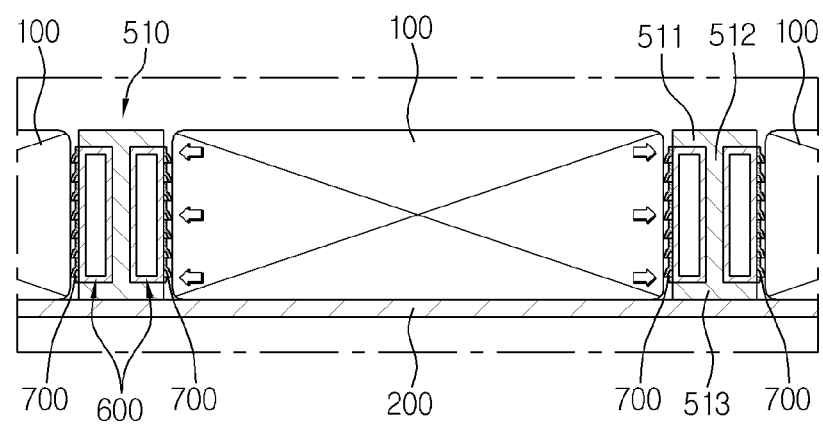
FIG. 8 is an enlarged view showing a portion A of FIG. 7.

Referring to FIG. 8, the I-type beam frame 510 according to the present disclosure includes a top portion 511 and a bottom portion 513, which are horizontal with respect to the upper surface of the tray 200, and a column 512, which vertically connects the centers of the top portion 511 and the bottom portion 513 to form the height of the I-type beam frame 510.

The spaces of the I-type beam frame 510 between the top portion 511 and the bottom portion 513 is divided into two parts by the column 512. Hereinafter, both the divided spaces, namely the spaces formed at both sides of the column 512, will be defined as recessed portions. The heatsink 600 is mounted in the recessed portion of the I-type beam frame 510. Here, the heatsink 600 may refer to an object that absorbs and emits heat from other objects by thermal contact.

More specifically, the heatsink 600 according to the present disclosure is manufactured to have a shape corresponding to the recessed portion of the I-type beam frame 510, and the input port 610 and the output port through which the coolant flows in and out are positioned at one end and the other end thereof. Also, the heatsink 600 has a hollow structure including a flow path therein. Each heatsink 600 may extend through the center frame 520 from one side of the tray 200 to the other side thereof along each I-type beam frame 510.

The coolant flowing in the flow path of the heatsink 600 is not particularly limited as long as it easily flows in the flow path and has excellent cooling ability, but for example, it may be water that is capable of maximizing cooling efficiency due to high latent heat.

The heatsink 600 may be integrated with the I-type beam frame 510. For example, the heatsink 600 and the I-type beam frame 510 are simply integrated by applying a thermal conductive adhesive to the inner surface of the I-type beam frame 510 and then inserting and adhering the heatsink 600 to the recessed portion of the I-type beam frame 510. In this case, the space utilization of the tray 200 may be increased compared to the case where the heatsink 600 is provided at a separate position.

That is, in the battery pack 10 of the present disclosure, one I-type beam frame 510 and two heatsink 600 may be combined with the corresponding shapes so that the space between the I-type beam frames 510 may be entirely utilized as a space for individually mounting the unit battery module 100, and the heat generated from each battery module 100 may be dissipated to both side surfaces of the battery module 100. In addition, since the I-type beam frame 510 may also be cooled by the heatsink 600, it is possible to prevent the I-type beam frame 510 from being deformed due to the temperature rise, thereby more effectively controlling the heat of the entire battery pack structure.

In addition, referring to FIGS. 6, 8 to 11 together, in the battery pack 10 according to the present disclosure, a heat conduction medium 700 of a louver structure may be further interposed into the thermal interface of the heatsink 600 and the battery module 100.

The heat conduction medium 700 includes a plate surface 710 attached to one surface of the heatsink 600 and a plurality of louver fins 720 formed to protrude downwardly at a predetermined acute angle with respect to the plate surface 710. The plate surface 710 and the louver fins 720 are conceptually distinguished from each other, and the plate surface 710 and the louver fins 720 may be integrally formed.

The heat conduction medium 700 may be made of aluminum or aluminum alloy, which has excellent thermal conductivity and light weight. Preferably, among aluminum alloy series, 10XX™ series may be used. The 10XX™ series aluminum alloy means pure aluminum for industrial use where 99% of its components is made of aluminum (Al). Due to high purity of aluminum, the workability and thermal conductivity are particularly excellent. However, since the strength is low, it allows elastic or plastic deformation.

The plate surface 710 of the heat conduction medium is made in a thin plate form having an approximately large area and attached to one surface of the heatsink 600. The heat conduction medium 700 may be attached by means of compressing, bonding, welding or the like, and preferably by laser welding. When the welding method is used, the heat conduction medium has a greatest contact force and greatest surface roughness between the plate surface 710 and the heatsink 600, thereby improving the thermal conductivity.

Figure 9:
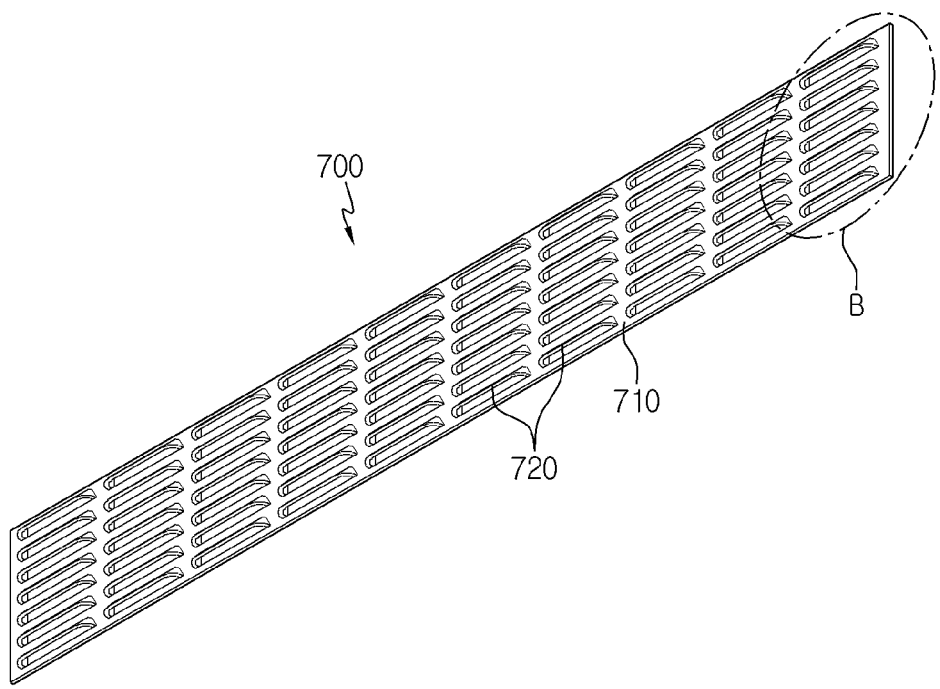
FIG. 9 is a perspective view showing a heat conduction medium according to an embodiment of the present disclosure.
Figure 10:
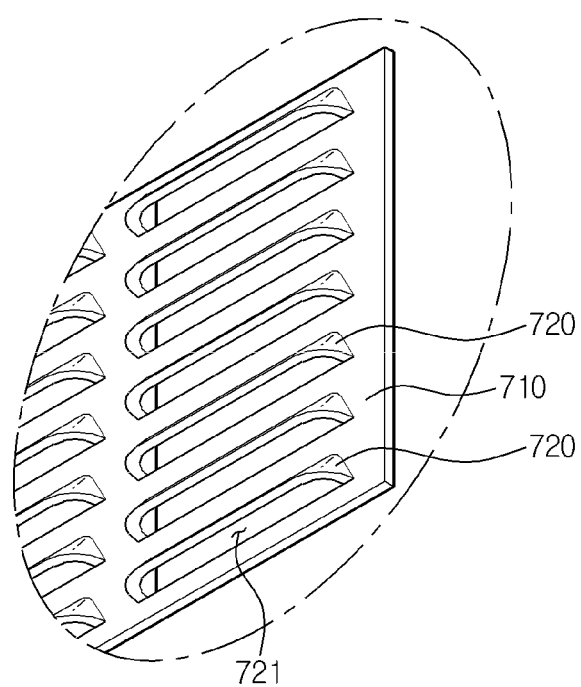
FIG. 10 is an enlarged view showing a portion B of FIG. 9.

As shown in FIGS. 9 and 10, the louver fins 720 of the same pattern may be repeatedly formed on the plate surface 710 of the heat conduction medium in horizontal and vertical directions of the plate surface 710. The louver fins 720 may be formed to protrude obliquely in a lower direction at a predetermined acute angle with respect to the plate surface 710, and an air vent 721 may be formed in the inner space of the louver fin 720. The air vent 721 may be formed to be enveloped by the louver fin 720.

Figure 11:
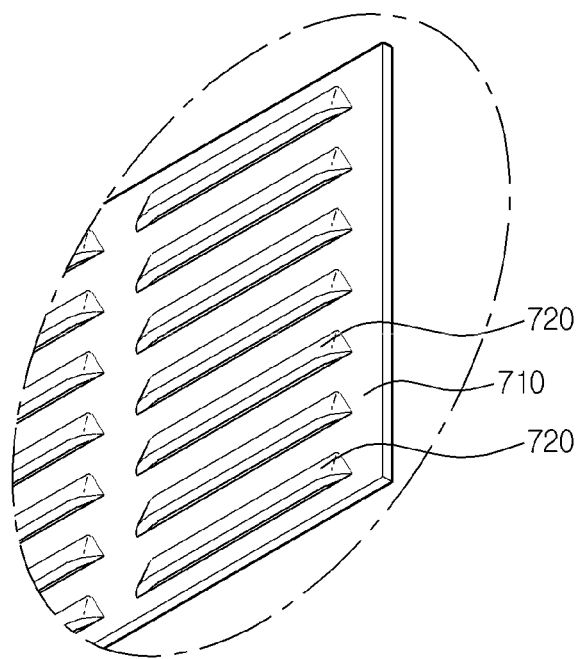
FIG. 11 a diagram for illustrating that the louver fins of FIG. 10 are plastically deformed.

Since the heat conduction medium 700 according to this embodiment is made of a 10XX™ M series aluminum alloy, the louver fins 720 may be plastically deformed when being subjected to an external pressure. As shown in FIG. 8, the battery module 100 is assembled to be inserted into the accommodation space S from the above. In this process, as shown in FIG. 11, the louver fins 720 may be pressed by both side surfaces of the unit battery module and flattened downward. Since the louver fins 720 are pressed to contact the side surface of the battery module 100 as described above when the battery module 100 is assembled, the contact state between the louver fins 720 and the battery module 100 may be strongly maintained, thereby maximizing thermal conductivity.

In addition, after the battery module 100 is fully placed in the accommodation space S, since the louver fins 720 are regularly oriented in the vertical direction, it is very difficult to pull the battery module back in a reverse direction. Thus, if the louver fins 720 are used, both side surfaces of the battery module 100 may be more stably supported, and the movement of the battery module 100 may be effectively prevented even when an external impact or vibration is applied thereto.

Meanwhile, the present disclosure is not limited to the heat conduction medium 700 having a louver structure made of an aluminum alloy. For example, the heat conduction medium 700 may have excellent thermal conductivity, and a portion of the louver fin 720 may be formed of a material with elastically deformable properties. For example, the louver fins 720 may be made of silicone rubber. Silicone rubber is excellent in heat conductivity and heat dissipation property and also has physical properties that cause elastic deformation when being subjected to an external pressure.

The louver fins 720 having elastically deformable properties may be pressed by the side surface of the battery module 100 and bent downward. At this time, the elastic restoring force to return to the original shape is generated to push the battery module 100, and thus the contact force to the battery module 100 may be greatly increased.

Hereinafter, a beam frame and a heat conduction medium 700 according to another embodiment of the present disclosure will be described with reference to FIGS. 12 and 13.

Figure 12:
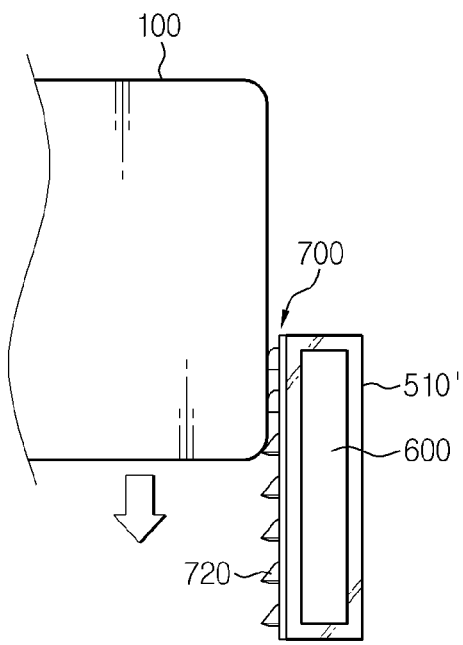
FIGS. 12 and 13 are diagrams showing a beam frame and a heat conduction medium according to another embodiment of the present disclosure.
Figure 13:
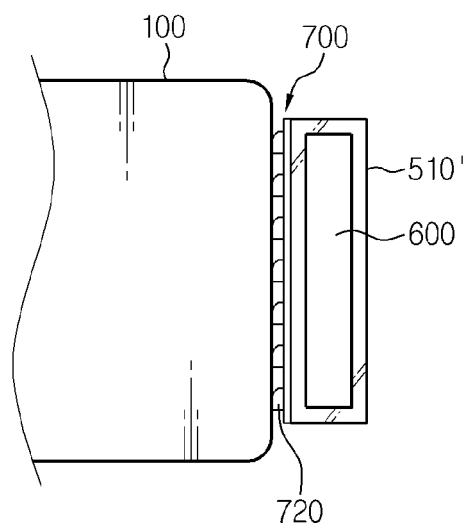

FIGS. 12 and 13 are diagrams showing a beam frame and a heat conduction medium according to another embodiment of the present disclosure. This embodiment described below may be regarded as approximately corresponding to the configuration of FIG. 8, when being compared with the former embodiment. The same reference sign designates the same component and will not be described in detail.

In this embodiment, an angled beam frame 510' with a hollow therein is provided, instead of the I-type beam frame 510 of the former embodiment. In addition, a heatsink 600 is located inside the angled beam frame 510'. If the heatsink 600 is located inside the angled beam frame 510' as described above, the space utilization of the tray 200 may be further improved.

Even though the angled beam frame 510' and the heatsink 600 are structurally distinguished in the above explanation, the angled beam frame may also serve as a heatsink in itself by providing a flow path at the inside of the beam frame 510'.

In this embodiment, as the heatsink 600 is disposed inside the angled beam frame 510', the heat conduction medium 700 having a louver structure is attached to one surface of the angled beam frame 510'. The heat conduction medium 700 having a louver structure is configured identical to the former embodiment. In other words, the heat conduction medium 700 of this embodiment includes a plate surface 710 having a thin plate form with an approximately large area and louver fins 720 repeatedly formed on the plate surface 710 in the same pattern. While the battery module 100 is being placed, the louver fins 720 are pressed by the side surface of the battery module 100 to be plastically or elastically deformed.

In addition, the battery pack according to the present disclosure may further include various devices (not shown) such as a battery management system (BMS), a current sensor, a fuse and the like, for controlling charge and discharge of the battery modules.

The vehicle according to the present disclosure may include the battery pack according to the present disclosure. The battery pack may be applied not only to vehicles such as electric vehicles and hybrid electric vehicles but also to IT products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack, comprising:
   a plurality of battery modules;
   a tray defining a space where the plurality of battery modules are placed;
   a plurality of beam frames traversing an upper surface of the tray to partition spaces where the plurality of battery modules are capable of being individually placed;
   a plurality of heatsinks having a hollow structure through which a coolant flows, the plurality of heatsinks being selectively coupled to a part of the plurality of beam frames so as to be disposed to face a side surface of the battery modules, respectively; and
   two side frames configured to cover both side surfaces of the tray, respectively,
   wherein a heat conduction medium, having a louver structure with a plurality of air vents allowing airflow to penetrate through the heat conduction medium, is interposed at a thermal interface of the heatsink and the battery module,
   wherein each of the heatsinks has an input port and an output port provided at one end and the other end thereof so that a coolant flows in or out therethrough, and
   wherein the two side frames are provided in the form of a manifold tube communicating with the input ports and the output ports of the heatsinks to form a path for supplying and discharging the coolant.

2. The battery pack according to claim 1, wherein the heat conduction medium includes:
   a plate surface attached to one surface of the heatsink; and
   a plurality of louver fins formed to protrude obliquely at a predetermined acute angle with respect to the plate surface,
   wherein the plurality of louver fins defines the louver structure.

3. The battery pack according to claim 2, wherein the plurality of louver fins have a property to be elastically or plastically deformed when an external pressure is applied thereto.

4. The battery pack according to claim 1, wherein the heat conduction medium is an aluminum alloy comprising pure aluminum for industrial use where 99% of its components is made of aluminum (Al).

5. The battery pack according to claim 2, wherein the plate surface of the heat conduction medium is laser-welded to one surface of the heatsink.

6. The battery pack according to claim 1, wherein:
   a part of the plurality of beam frames is an angled beam frame with a hollow therein; and
   the heatsink is located inside the angled beam frame.

7. The battery pack according to claim 1, wherein:
   a part of the plurality of beam frames is an I-type beam frame; and
   the heatsink is provided to be mountable to recessed portions formed at both sides of a column that forms a height of the I-type beam frame.

8. The battery pack according to claim 7, wherein the heatsink is shaped corresponding to the recessed portion and is adhered thereto by a thermal conductive adhesive to be integrated with the I-type beam frame.

9. The battery pack according to claim 8, wherein:
another part of the plurality of beam frames is a single center frame that traverses a center of the tray; and
the I-type beam frames intersect the center frame and are disposed at the tray at regular intervals, so that the plurality of battery modules are arranged in a 2×N matrix.

10. The battery pack according to claim 9, wherein each of the heatsinks is installed to traverse the upper surface of the tray along the I-type beam frames through the center frame.

11. The battery pack according to claim 10, further comprising a pack cover configured to cover an upper portion of the tray.

12. The battery pack according to claim 7, wherein:
the center frame is provided in the form of an angled tube having a plurality of holes formed at an outer side surface thereof; and
a connecting module is provided in the center frame to connect the plurality of battery modules in at least one of series and in parallel.

13. A vehicle, comprising the battery pack defined in claim 1.

* * * * *